May 1, 1923.

V. BENEDEK

COFFEEPOT

Filed April 30, 1921

1,453,489

Witnesses,
H. S. Clock.
J. D. Stuwe.

Inventor,
Victor Benedek,
By Joshua R. H. Potts
His Attorney.

Patented May 1, 1923.

1,453,489

UNITED STATES PATENT OFFICE.

VICTOR BENEDEK, OF CHICAGO, ILLINOIS.

COFFEEPOT.

Application filed April 30, 1921. Serial No. 465,680.

*To all whom it may concern:*

Be it known that I, VICTOR BENEDEK, a citizen of the United States, and a resident of the city of Chicago, county of Cook, and State of Illinois, have invented certain new and useful Improvements in Coffeepots, of which the following is a specification.

My invention relates to improvements in coffee pots, and has for its main object to provide a coffee pot having a shell of brass or other suitable metal with an inner coffee container of aluminum mounted in said shell.

Other objects will appear hereinafter.

The invention consists in the combinations and arrangements of parts hereinafter described and claimed.

Figure 1:
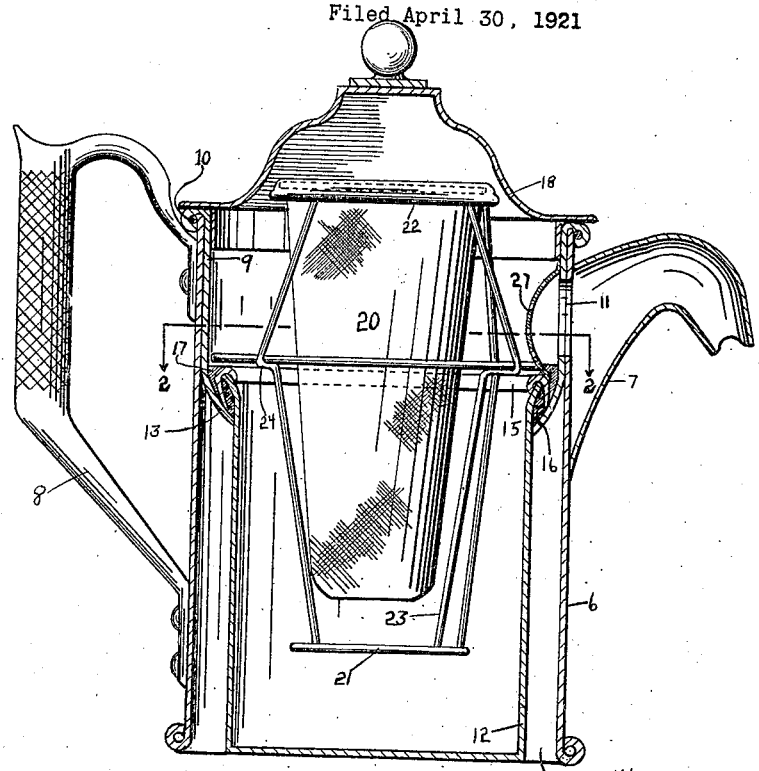
Figure 2:
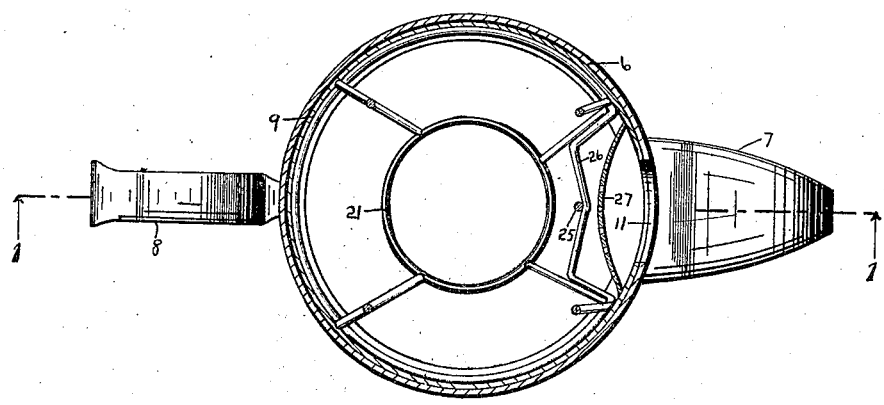

The invention will be best understood by reference to the accompanying drawings forming a part of this specification, and in which, Fig. 1 is a vertical sectional view taken on line 1—1 of Fig. 2; and Fig. 2 is a horizontal sectional view taken on line 2—2 of Fig. 1.

The construction shown in the drawing comprises a shell 6 open at the lower end and provided with a spout 7 and a handle 8. A sleeve 9 is mounted in the upper portion of the shell, having a driving fit therein, and has its upper edge curled and embracing a wire ring 10 by means of which curl and ring, it clamps the upper edge of the shell. A spout opening 11 is provided through the shell and sleeve in registry with the spout 7. An aluminum inner member or container 12 is used in place of the usual inner members of enameled ware or tinned ware, and is mounted in the lower inturned portion 13 of the sleeve. The surface of the container is separated from the interior of the shell forming an air space 14 between said container and shell.

In practice, it has been found difficult to fasten aluminum to brass or similar metal by means of solder especially where the joined metals were subjected to considerable heat and also to steam, as in the case with coffee pots. The heat and steam had the effect of loosening the solder from the aluminum and thereby breaking the fluid-tight joint. I have provided a special joint or connection between the aluminum container and the brass sleeve, which connection comprises a curved brass ring 15 the inner end of which clampingly engages over the upper edge of the container 12 and the lower edge of which is seated upon the inturned portion 13 of the sleeve. This ring and container I fasten in the sleeve by placing a binding material 16, preferably metal cement, in the space bounded by the members 12, 13 and 15, as shown in Fig. 1 of the drawing. The ring is clamped upon the upper edge and supports the container in the sleeve, and the metal cement forms a fluid-tight closure between the aluminum container and the ring and sleeve. A quantity of solder 17 is placed in the groove formed between the curved ring and the portion 13 of the sleeve. A suitable cover 18 is provided for the top. The members so far described, excepting the aluminum container 12, are preferably constructed of brass tinned on the inside and may be nickel plated on the inside and outside if desired.

A coffee bag 20 of fabric or any suitable material is mounted upon a supporting rack 21 by means of a rigid rim 22 which embraces the upper portion of the rack. The rack comprises upright members 23 having laterally extending elbows 24 by means of which the rack is supported upon the container. The upright members 23 are properly spaced and retained in position by a suitable upper, a lower and an intermediate ring, and a vertical wire 25 is provided while the intermediate ring contains an inwardly bent portion 26 by means of which wire and bent portion the coffee bag is prevented from bearing against and clogging the strainer 27 mounted in the sleeve across the spout opening 11. The wire members of the rack are tinned and may also be nickeled if desired.

The rack is easily removable from the coffee pot and by means of its bent portion 26 retains its proper position therein, and the coffee bag is easily removable from the rack. The sleeve and container are fixed together but may be withdrawn upwardly from the shell if desired.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:

1. A coffee pot comprising an outer metallic member, and an inner member mounted therein, said inner member including an aluminum container and a metal sleeve embracing and supported on the upper edge of said container.

2. A coffee pot comprising an outer metallic member, an inner member removably mounted therein, said inner member including an aluminum container and a metal supporting sleeve fixed to said container by means of a curved clamping ring and a binding material.

3. A coffee pot comprising a brass shell open at its lower end, a metal sleeve fastened in and curling over the upper portion of said shell, and an aluminum inner container cemented to the lower inturned portion of said sleeve.

4. A coffee pot comprising a shell, an aluminum liquid container mounted in said shell, a rack removably mounted with an intermediate portion on the upper edge of said container, and a coffee bag removably mounted on said rack and extending into said container.

5. A coffee pot comprising a shell, a container mounted in said shell, a rack removably mounted on said container, a coffee bag removably mounted on said rack, a strainer fixed to said shell over a spout opening, and means on said rack to retain said bag from bearing against said strainer.

6. A coffee pot comprising a shell which is open at its lower end, an aluminum container mounted in said shell with its walls separated from the walls of said shell, and a sleeve supporting said container and closing the opening between the upper edge of said container and the shell, said sleeve being provided with a spout opening and a strainer.

7. A coffee pot comprising a shell open at its lower end, a metal sleeve mounted with a driving fit in the upper portion of said shell, and an aluminum container fixed to said sleeve by means of a curved member and metal cement, there being an air space between said container and sleeve.

In testimony whereof I have signed my name to this specification in the presence of a subscribing witness.

VICTOR BENEDEK.

Witness:
  FREDA C. APPLETON.